United States Patent [19]

Spence-Bate

[11] 4,037,926
[45] July 26, 1977

[54] PHOTOGRAPHIC FILM READING INSTRUMENT

[76] Inventor: Harry Arthur Hele Spence-Bate, Lot 115, Cheam Place, Morley, Western Australia, 6062, Australia

[21] Appl. No.: 519,674

[22] Filed: Oct. 31, 1974

[30] Foreign Application Priority Data

Nov. 5, 1973   Australia .............................. 5534/73

[51] Int. Cl.² ...................... G02B 27/02; G02B 27/22
[52] U.S. Cl. .................................... 350/135; 350/141; 350/241; 350/248
[58] Field of Search ............... 350/134, 135, 140, 141, 350/241, 248; 40/64 A, 63 A, 86 A

[56] References Cited

U.S. PATENT DOCUMENTS

| 2,387,758 | 10/1945 | Jaros | 350/135 |
| 2,667,810 | 2/1954 | Jaros | 350/135 |
| 2,674,152 | 4/1954 | Wilkinson | 350/134 X |
| 2,727,434 | 12/1955 | Miselli | 350/134 X |
| 3,216,778 | 11/1965 | Davies et al. | 350/135 X |
| 3,229,396 | 1/1966 | Shaw | 40/86 A |
| 3,710,488 | 1/1973 | Baxter | 350/241 UX |
| 3,722,983 | 3/1973 | Brassington | 350/135 |
| 3,850,505 | 11/1974 | Ratliff, Jr. | 350/134 X |

FOREIGN PATENT DOCUMENTS 504,358   11/1928   Germany .............................. 350/135

Primary Examiner—John K. Corbin
Assistant Examiner—Matthew W. Koren
Attorney, Agent, or Firm—Fidelman, Wolffe & Waldron

[57] ABSTRACT

A photographic film reader mountable on a person's head provides X and Y axis movement for a film lamina, illumination for one or more portions of the film and an image magnifier for the illuminated portions.

8 Claims, 3 Drawing Figures

PHOTOGRAPHIC FILM READING INSTRUMENT

The present invention relates to a photographic film reading instrument, such as may be for example used for reading microfilms or microfiches.

Such reading instruments referred to hereafter as "readers" exist in a variety of forms, but are essentially designed for use at a fixed or static location. With the increase in use of microfilm or microfiches for information, there is a requirement for the reader to be readily portable and available for such purposes as providing information for servicing or repair of equipment.

Accordingly, the invention provides a photographic film reader comprising means for moving a film lamina in X and Y - axis, means for illuminating one or more portions of the film, means for magnifying the image or images on the portions and means for enabling the reader to be carried on a person's head.

Such a reader enables a person to have his hands free to carry out a maintenance task using the information on the microfiche or microfilm. By carrying the reader on his head, a person can direct his vision from the reader to the task and back to the reader.

Preferably, two portions of the film are illuminated and are arranged to be read simultaneously so as to provide a stereoscopic visual display. This enables a maintainer to see the information more clearly and so to speak, look around the corner of the task in hand. It is preferable that the reader is adapted to take a microfiche of standard size such as British Standard 4187:1947 which is for a microfiche lamina to be of 148 mm. x 105 mm. In this way the reader can be constructed in a simple fashion. The reader can be adapted to take an image density of 12 columns in the COSATI standard or 14 columns in the N.M.A. With a stereoscopic readers columns 1 and 7 to columns 6 and 12 would be read in the COSATI standard. In the N.M.A. standard, with a stereoscopic reader columns 1 and 8 to 7 and 14 would be read.

The means for moving the film lamina preferably comprises a pair of rollers mounted for rotation and also for axial movement, the rollers being constructed so as to grip the lamina. Rotational movement provides Y-axis shift and axial movement provides X-axis shift. The rollers could be coupled for rotation by an intermediate gear or roller or linked by chain or band drive. Lamps are preferably provided for illumination of the portions of the film. Alternatively, means can be provided for collecting ambient light for illumination of the portions of the film.

The rollers are preferably mounted in an enveloping casing provided with a door at a lower side. This enables the film to be protected and reduces the entry of injurious dust and other particles. The casing may be provided with internal ribs aligned with the Y-axis so that particles trapped in the casing can fall between the ribs to the bottom of the casing without damaging the film.

The means for magnifying the image or images is preferably mounted outside the casing.

The rollers may be removable and replaced by rollers, reels or cassettes designed to carry microfilm of, for example, the 24 mm. or 16 mm. standard.

The invention will now be described with reference to the accompanying drawings in which.

Figure 1:
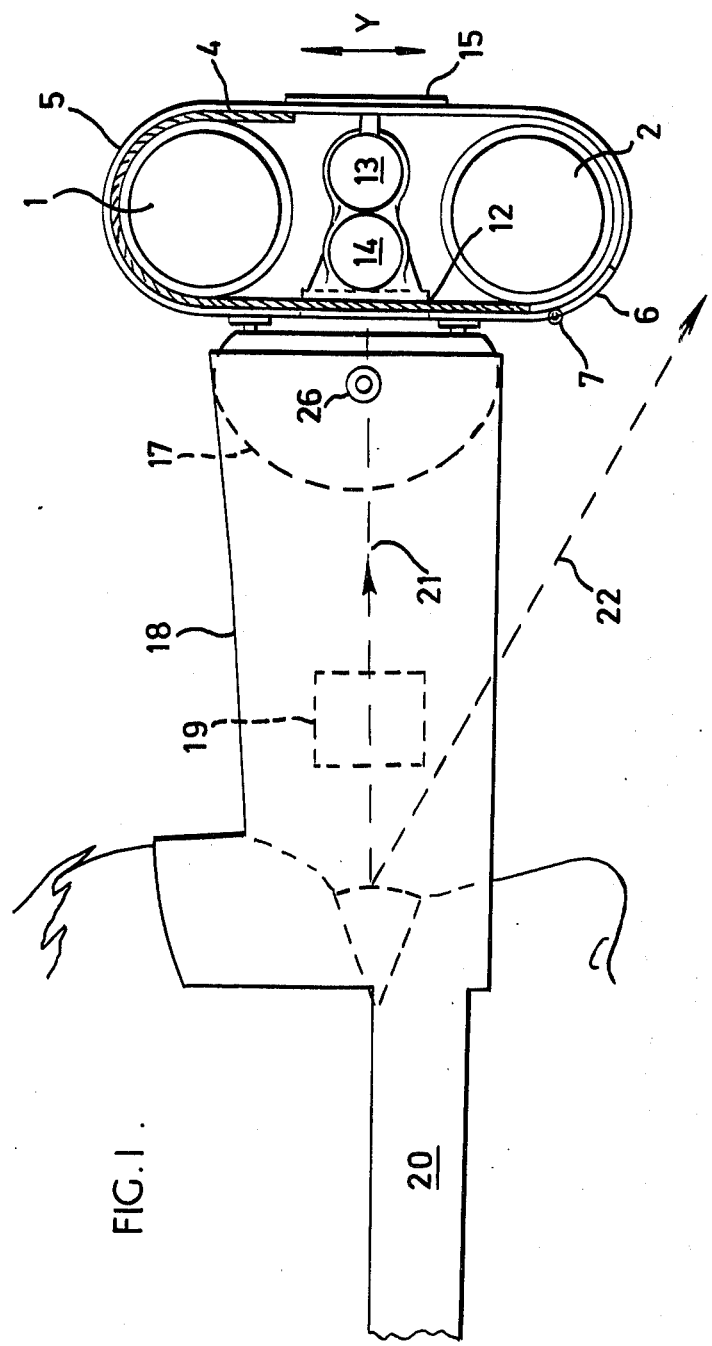
FIG. 1 shows a side view of a reader according to a first embodiment of the invention.

The drawings show a first embodiment of a reader designed for stereoscopic reading. The reader is provided with means for moving a film lamina in an X and Y - axis direction. The means consists of two equal sized main lamina gripping rollers 1 and 2, with an intermediate roller 3, which drivably connects rollers 1 and 2. The rollers 1, 2 and 3 are arranged for axial movement in the X direction and by rotation of the rollers, the lamina 4, seen in FIG. 1, can be moved in a Y - axis direction. Although the rollers 1 and 2 are coupled for rotation by the intermediate roller 3, this arrangement of the intermediate roller 3 could be alternatively a gear chain or band drive.

The rollers 1, 2 and 3 are mounted in an enveloping casing 5, which is provided with a door 6 at the lower side of casing. The door 6 is hinged at 7 and is so placed that by rotation of the rollers so that the lamina 4 moves in a Y - axis direction downwards, the lamina 4 is finally ejected through the door 6.

Figure 3:
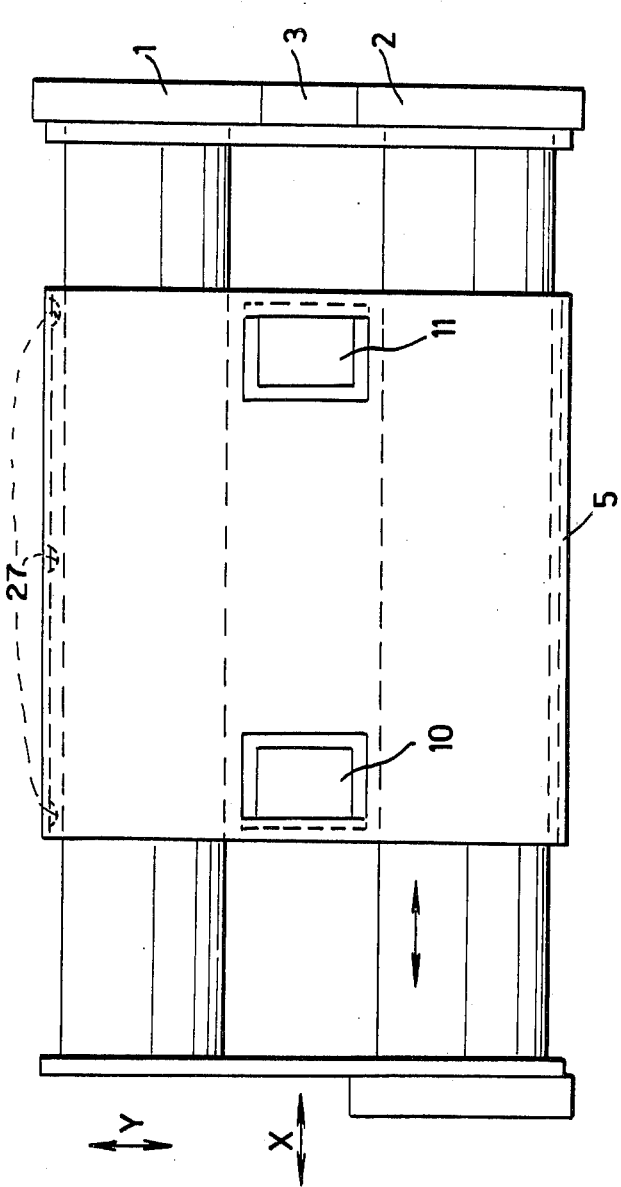
FIG. 3 shows a side view of the control part of the embodiment shown in FIG. 1.

A plurality of ribs 27, as shown in FIG. 3, are provided on the internal surface of the casing 5. The ribs are aligned in a Y - axis direction so that particles dropped in the casing can fall between the ribs to the bottom of the casing without damaging the film. Suitable holes at the bottom of the casing are provided to enable the particles to be removed, or removed themselves, from the casing.

Figure 2:
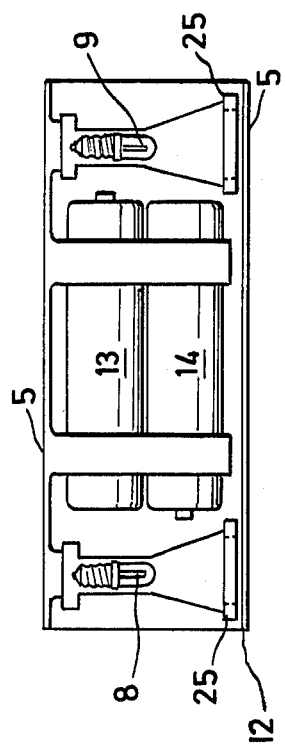
FIG. 2 shows a cross sectional plan view of part of the embodiment shown in FIG. 1.

The casing is provided, as may be seen in FIG. 2 with two internal lamps 8 and 9, which illuminate two windows 10 and 11 so that the images on the lamina for passing the gap 12 can be illuminated.

The lamps are powered by two dry cell batteries 13 and 14, held within the casing 5.

The casing 5 is further provided with a plug 15, through which access to the batteries 13 and 14 may be obtained.

The casing is mounted on the swivelling mounting 17 on a head piece 18. Within the head piece suitable magnifying lenses 19 are provided to enable a viewer to see the micro images. The head piece is further provided with a band 20, which goes round the back of the viewer to provide support for the reader.

As may be seen from FIG. 1, the viewer can either look through the magnifying lens along the line of sight 21, or else look downward on his work along the line of sight 22.

The reader is designed to take a microfiche of standard size, such as British Standard 4187:1947 which is for a microfiche lamina of 148 mm. × 105 mm. Alternatively, a microfilm reading arrangement may be provided for reading 24 mm. and 16 mm. roll film. In order to convert the reader to read microfilm rather than microfiche the rollers 1, 3 and 2 are removed from casing 5 and cassettes are slid into the vacated spaces.

To operate the reader a microfiche is inserted at the door 6 and knob 2, which has a gripping surface is rotated to drive the microfiche lamina up through the gap 12 to the roller 1. The rotation of knob 2 causes roller 1 to rotate via the intermediate roller 3. The lamina is fed into the gap 12 between the lamp housings 25 and the inner surface of the casing 5. After the door 6 is closed, the microfiche can be moved upwards and downwards in the Y - axis direction and at the same time can be moved axially in the X - axis direction by pushing all three rollers 1, 2 and 3 to one side or the other. After finishing reading the microfiche lamina (the door is opened) and due to the inherent elasticity of the film material of microfiche, the microfiche will tend to straighten itself out and fall out of the door 6.

For monoscopic viewing a single portion of the film only is required to be illuminated and the lamp housing 25, together with batteries 13 and 14 can be removed from the casing and replaced by a single lamp housing. For monoscopic viewing a lamina may be inserted so that its line sight travels in Y - axis direction.

In order to make the reader more versatile the reader head, consisting of the casing 5 and its contents, can be removed from the head piece 18 by unfastening a swivel attachment 26 on the head piece 18. In this way the reader head can be attached to specialised headgear such as smoke masks or helmets. Also the head piece can be used without the reader head as a binocular magnifying instrument to inspect for instance an electronic circuit.

As regards the ribs in the casing 5 these can be formed of a resilient material so that slight pressure on the back of the casing makes the ribs open up which allows free movement of the lamina when an image is being positioned.

For daylight use the lamp housings may be removed thus allowing an unobstructed light path from the back. If extra directional light is needed swivelling mirrors or prisms may be provided on the casing. Furthermore, for the lamps a light level adjuster may be used.

For spectacles using the head piece 18 room is provided for accommodation of the spectacles.

In order to make the reader more portable, the head piece can be made to fold.

It will be appreciated that a stereoscopic reader has the additional advantage that in the event of damage to one microfiche image, the second image is always available.

What is claimed is:

1. A photographic film reader comprising:
a casing, means in said casing for holding a micro image bearing microfiche lamina;
means connected to said holding means for moving said lamina in both an X-axis and a Y-axis direction; said means comprising a pair of equal sized rollers mechanically coupled for synchronous rotation in the same direction and further arranged for axial movement, the rollers being constructed so as to grip the lamina and to provide a passage for said lamina between the roller surfaces and the inner casing wall, the rotational movement of said rollers providing Y-axis shift and axial movement providing X-axis shift,
means in said casing for illuminating at least one micro image on said lamina,
means in said reader for magnifying said micro image,
means connected to said casing for attaching said reader to a viewer's head,
a first optical path in said reader between the viewer and said micro image through said magnifying means, and
a second optical path in said reader between the viewer and a point outside said reader such that the viewer may select without moving said casing or reader either said first or said second optical path by shifting his vision.

2. A photographic film reader as claimed in claim 1 wherein two micro images are illuminated and are arranged to be read simultaneously so as to provide a stereoscopic visual display.

3. A photographic film reader as claimed in claim 2 wherein said lamina is a microfiche sized 148 mm. × 105 mm. and wherein said micro images are arranged in stereo pairs.

4. A photographic film reader as claimed in claim 1 including means for collecting ambient light for illumination of said micro image.

5. A photographic film reader as claimed in claim 1 wherein said illuminating means includes lamps.

6. A photographic film reader as claimed in claim 1 wherein said casing envelopes said rollers and includes a door at a lower side.

7. A photographic film reader as claimed in claim 6 wherein the casing is provided with internal ribs aligned with the Y - axis so that particles trapped in the casing can fall between the ribs to the bottom of the casing without damaging the lamina.

8. A photographic film reader as claimed in claim 6 wherein the magnifying means is mounted outside the casing.

* * * * *